Patented Nov. 7, 1933

1,934,057

UNITED STATES PATENT OFFICE 1,934,057

INSECTICIDE

Dudley H. Grant, Moorestown, N. J., assignor to Standard Oil Development Company, a corporation of Delaware No Drawing. Application October 31, 1928
Serial No. 316,359

6 Claims. (Cl. 167—24)

This invention relates to improvements in insecticidal or insect-repelling compositions containing the active principle of a plant of the class known as "fish poisons" belonging to the order of Leguminosæ and genera Derris, Lonchocarpus, Tephrosia, etc., known variously as tuba, cube, haiari, timbo, etc. The object of the invention is the preparation of an insecticide which is comparatively harmless either to plants or to higher animals or to man. This object is realized by fortifying the insecticidal power of white oil or other petroleum oils by the addition of extracts of said plants, without thereby aggravating the injurious properties of the oil as regards plants. This method permits the effective use of higher dilutions of oil, thereby enlarging the field of usefulness of petroleum insecticides. There are other advantages, which will be pointed out hereafter.

The invention will be fully understood from the following description serving to illustrate the principal methods by which it can be carried out with special reference to the derris extract, it being understood that the same method can be applied generally to other "fish poisons".

The derris roots are extracted with a volatile solvent, such as benzol, isopropyl alcohol, etc. The extraction may be carried out by any of the known methods, such as percolation, maceration, etc. This method is especially adapted to prepare concentrated extracts and consists of causing the solvent to flow over and through the substance to be extracted without flooding it. The volatile solvent is then evaporated partially or wholly, preferably in vacuo, leaving a concentrated derris extract. The latter is then emulsified with a petroleum oil, preferably of the kind known as white oil, and made by intensive acid treatment of gas oil or lubricating oil fractions, such as machine oil, transformer oil, light or medium lubricating oils, etc. The emulsification may be carried out by dissolving an emulsifying agent, such as soap, in the white oil and feeding it, together with the dry derris extract, into a colloid mill to obtain a stable emulsion. Some water may be thoroughly admixed with this product before marketing.

Another method which may often be used with advantage is the following. The insecticidal or active principles of the derris root are extracted directly with the "white oil". Volatile solvents such as alcohols, ethers, esters, ketones for instance acetone, aromatic hydrocarbons, for instance benzene, or chlorinated hydrocarbons may be added to the white oil to increase its solvent power. In this case, however, it is preferable to distil off subsequently most of the volatile solvents from the product obtained. A similar result may be obtained by adding steam distilled pine oil, terpineol, phenol, cresol, or their homologs, cyclohexanol and its homologs, hydrogenated naphthalenes such as tetralin or decalin, chlorinated naphthalenes such as halowax oil, etc., to the white oil to increase its solvent power for the derris extractives. The ingredients just mentioned cannot and should not be removed by subsequent distillation but remain in the product and confer upon it a fungicidal and bactericidal effect in addition to its insecticidal properties and facilitate its emulsification. The derris white oil extract is then mixed with an emulsifying agent, such as fatty soap, rosin soap, saponin, soaps of petroleum sulfonic acids, soaps of sulfonated vegetable or animal oils, to form a composition capable of dispersing in water. Any one soap or a mixture of several soaps may be used. Part of the soap may be added to the white oil before the extraction because I have found that the presence of a soap facilitates the extraction. I preferably use oil-soluble sulfonates as an emulsifying agent, obtained in the refining of said white oils.

The product may be marketed either in the form of a homogeneous liquid mixture of oil, derris extractives, emulsifier and added solvents or fungicides, practically free from water, or in the form of a stock emulsion of creamy or buttery consistency containing up to 35% of water. Its composition may greatly vary according to the requirements of the market and the transportation facilities. Products containing as high as 75% derris extractives may be prepared. The practical limits of the components are the following:

1 to 25% derris extractives
40–80% white oil
5–25% soap or other emulsifier and fungicide
0–35% water Usually the percentage of the derris extractives is kept within the limits of 1 to 10%.

The marketed product is further diluted with water before use, to such extent that the composition of the final diluted spray is about the following:

0.06 to 0.25% derris extractives
0.5–1.00% petroleum white oil
0.2–1.00% soap
97–99.00% water The derris white oil insecticide just described constitutes a means of fortifying the insecticidal power of the white oil. Emulsions of white oil have been previously used in the art as insecticides but their factor of safety is very limited. The concentration of oil required to kill most of the insects against which such emulsions are used is at least 2%, whereas this concentration is not always innocuous to trees in foliage, frequently causing leaf burn and fruit drop. If the concentration of oil in the final spray is reduced to 1% or less, the danger to the trees is practically eliminated, but control of the insects is no longer efficient. The use of derris extractives makes it possible to fortify white oil or other petroleum emulsions and makes them effective insecticides at oil concentrations lower than have hitherto been found effective, thereby broadening their margin of safety. A spray of the above composition is an efficient insecticide which is harmless to higher animals and to man as well as to plants such as trees in foliage, etc.

Another obvious advantage of the new insecticide is that the variety of insect pests which may be controlled by it is greater than that controlled by either petroleum or derris alone, thereby effecting economy in application since one spraying may accomplish the work of two by earlier methods. It is effective against pests such as the various aphids, tent caterpillars, scale insects, red mite, tomato moth, cabbage worm, sawflies, etc.

I have described my invention of derris-petroleum oil insecticide with special reference to the white oil extract. The white oil has the advantage of being less injurious to plants than the engine oils, paraffin oils and other petroleum oils often used as insecticides, so that higher concentrations may be used in the final spray. However, the white oils are more expensive than the less highly refined oils and accordingly the process can be modified in various ways so as to reduce the price of the final spray.

Another practical modification is to prepare a concentrated derris extract using, instead of the white oil as solvent, kerosene alone or admixed with volatile solvents such as benzol, alcohols, acetone, esters, etc. capable of being distilled off subsequently, or with non-volatile solvents such as steam-distilled pine oil, phenol or its homologs, etc. White oil is added to the extract, which is then emulsified so as to obtain a mixed derris-white oil-kerosene insecticide. The product may be marketed with a water content varying between 0–35% and diluted with water before use as a final spray.

The following concrete sample will serve to illustrate one of the methods by which my invention may be carried out.

2 kilograms of ground derris roots were extracted with 4 litres of benzol. Distilling off the solvent in vacuo, 113 grams of dry extract were obtained, representing 5.65% of the dry derris roots, and having the appearance of a reddish-brown resin. 80 grams of this extract were fed into the colloid mill together with a solution of 750 grams of oil soluble sodium sulfonate in 2.5 litres of "Wyrol", a commercial brand of white oil. Water was also added in the amount of 1.5 litres. A thick emulsion resulted similar in appearance to mayonnaise and ready for marketing. Part of this preparation was diluted with 50 times its weight of water and gave a final spray which was effective when sprayed on trees as an insecticide.

A similar insecticidal spray was prepared with cube extract. 2 kilograms of dry cube root were extracted with 4 litres of isopropyl alcohol. After evaporation of the solvent in vacuo 105 grams of extract were left in the flask. 80 grams of this extract were worked up in exactly the same manner as in the case of the derris extract, using the same proportion of ingredients. The final, diluted product was again a very effective insecticidal spray.

It will be understood that the invention is not limited to the particulars given which may be varied within wide limits but only by the scope of the appended claims in which it is my intention to claim all novelty inherent in the invention as broadly as the prior art permits.

I claim:

1. An insecticide or insect repellent comprising a petroleum white oil, derris extract and an emulsifying agent.

2. An insecticide or insect repellent comprising a petroleum white oil, less than 25% derris extractives and an emulsifying agent.

3. A composition according to claim 2 with the further addition of water.

4. A composition according to claim 2, comprising 0.06 to 0.25% derris extractives
    0.5–1.00% petroleum white oil
    0.2–1.00% soap with 97–99.00% water as further addition.

5. An insecticide or insect repellent, comprising a petroleum white oil, an extract of a plant belonging to the class known as fish poisons, and an emulsifying agent.

6. A composition of matter comprising an aqueous emulsion containing an organic solvent extract of derris incorporated in a viscous mineral white oil.

DUDLEY H. GRANT.